United States Patent [19]

Moore

[11] Patent Number: 4,483,069

[45] Date of Patent: Nov. 20, 1984

[54] APPARATUS FOR CUTTING VEGETATION

[75] Inventor: Robert J. Moore, Fontana, Calif.

[73] Assignee: Emerson Electric Co., St. Louis, Mo.

[21] Appl. No.: 62,871

[22] Filed: Aug. 1, 1979

[51] Int. Cl.³ .................................... A01D 55/00
[52] U.S. Cl. ................................ 30/276; 56/12.7
[58] Field of Search ............... 30/276, 347; 56/12.7

[56] References Cited

U.S. PATENT DOCUMENTS 4,104,796  8/1978  Sheldon .......................... 30/276
4,236,312 12/1980  Foster et al. .................... 30/276
4,347,666  9/1982  Moore ............................ 30/276

OTHER PUBLICATIONS

Homelite SF-100 String Trimmer, Apr. 1978.

Primary Examiner—Jimmy C. Peters
Attorney, Agent, or Firm—Hubbard, Thurman, Turner & Tucker

[57] ABSTRACT

An apparatus for cutting vegetation with a rotating head carrying a flexible, non-metallic cutting line extended radially into a cutting plane. An additional length of line is extended into the cutting plane by stopping and starting rotation of the head. A laterally displaced cam within the head moves outwardly for releasing a spool carrying coiled cutting line to rotate a predetermined angular displacement within the head. After the cutting line length is extended, the spool is secured automatically against further rotation within the head.

5 Claims, 6 Drawing Figures

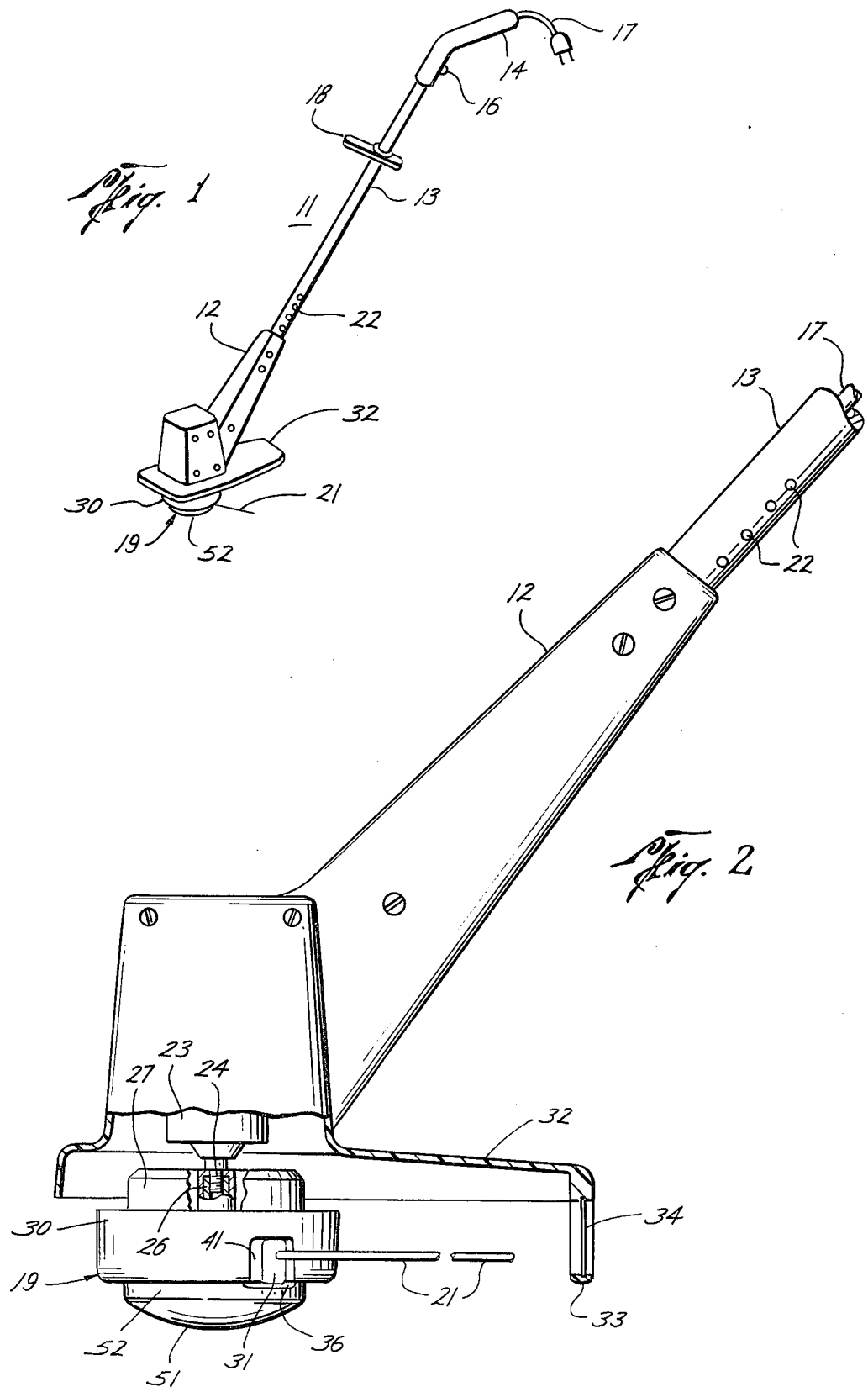

APPARATUS FOR CUTTING VEGETATION

BACKGROUND OF THE INVENTION

1. Field of the Invention

This invention relates to the cutting of vegetation, and more particularly, it relates to the cutting of vegetation using a flexible, non-metallic cutting line extending from a rotating head into a cutting plane.

2. Description of Prior Art

Various types of devices have been proposed for many years to facilitate the removal of vegetation by mowing, trimming, edging and like operations. In general, these devices have employed a metal blade to effect vegetation removal. Devices of this nature employ prime movers such as electric and gasoline motors. As a result, rotating metal blades can inflict serious and terrible injury upon the user.

In about 1960, there was developed in Europe a trimmer-edger unit employing a flexible polymeric line extending from a rotating head for cutting vegetation. This unit did not work properly because of several defects in structure and operating parameters. In the United States of America, practical vegetation-cutting devices using flexible, non-metallic lines carried upon a rotating head were developed. The devices are shown in U.S. Pat. Nos. 3,708,967, 3,826,068, 3,859,776 and 4,035,912. These patented devices have met outstanding success in the worldwide marketplace. One reason for this success is that these American developments are probably the safest electrical or gasoline-powered tools yet invented for vegetation cutting, edging and trimming operations.

The devices shown in these patents employ a flexible cutting line, such as manufactured from Nylon ® polymer. The cutting line is carried upon a spool internally of a rotating head. When desired to replenish the line or to extend an additional length of it, the rotation of the head was stopped and line manually extended from the head by either (1) uncoiling directly from the head; or (2) unlocking an internal spool, pulling the line from the head to the desired length and releasing the locking mechanism so that the spool was again secured against rotation in the head. These structures in the patented devices have been found to be convenient, simple and reliable. In many of the smaller devices, especially those powered by electric motors, a simpler system to extend the cutting line from the head was desired. The present invention is a device for cutting vegetation in the nature of the patented devices, wherein a simple but reliable mechanism is employed for extending selectively the cutting line in a certain length from the head. More particularly, this novel device or apparatus is simple to operate and has no complicated mechanisms. A speed-sensitive cam within the head controls rotation of an internal spool to provide for selective feeding of cutting line into the cutting plane. A change in speed of rotation of the head activates the cam which allows spool rotation until a certain length of cutting line is fed from the head. Now, the spool is re-locked by the cam to the head. The head is rotated by conventional electric or gasoline motors that rotate the head at speeds reflecting the length of cutting line extending into the cutting plane. For example, an electric motor may rotate the head with a six-inch extended line at 6,000 rpm and at 7,000 rpm with a three-inch extended cutting line length. Thus, the change in speed can be automatically produced by changes in length of the cutting line.

SUMMARY OF THE INVENTION

In accordance with this invention, there is provided an apparatus for cutting vegetation which has a planar head rotatable about an axis of rotation and a drive connection extending from a first face. A second face on the head may have a smooth convex surface free of projections and recesses which are capable of trapping appreciable vegetation. A spool is carried by the head and is mounted for rotation independently thereof. A flexible, non-metallic cutting line is coiled about the spool and has a free end extending outwardly of the head into a cutting plane. A cam is mounted for lateral movement within the head. This cam is laterally displaced by a change in the rotational speed of the head. Preferably, the rotation of the head is stopped and started for feeding cutting line. Displacement of the cam to its outward station releases the spool for rotation within the head and provides for feeding cutting line into the cutting plane. After extending a certain length of cutting line from the head into the cutting plane, the cam secures the spool against further rotation relative to the head.

DESCRIPTION OF THE DRAWINGS

FIG. 1 is a pictorial view illustrating one embodiment of the apparatus for cutting vegetation arranged according to the present invention;

FIG. 2 illustrates in enlargement the lower portion of the apparatus shown in FIG. 1;

DESCRIPTION OF SPECIFIC EMBODIMENTS

Figure 3:
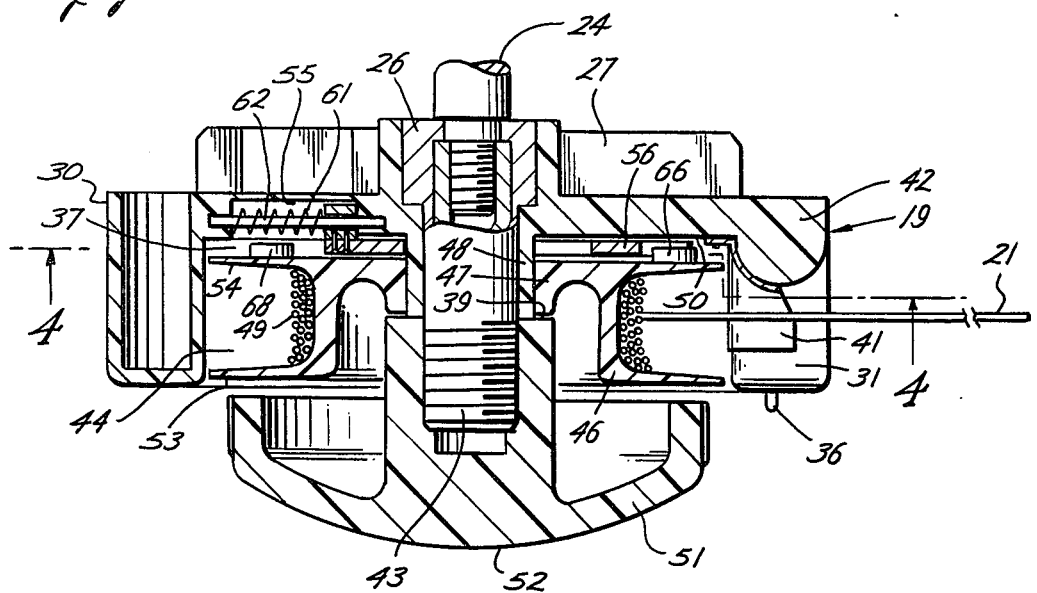
FIG. 3 is a vertical section, in enlargement, taken through the head of the apparatus shown in FIG. 2.

Referring to FIG. 1, there is shown an apparatus for cutting vegetation, which is constructed in accordance with one embodiment of the present invention. In this particular embodiment, the apparatus is a grass trimmer 11, but it could be a lawnmower, edger or other device for vegetation-cutting purposes. The trimmer 11 has a lower housing 12 interconnected by a tube 13 to a handle assembly 14. The assembly 14 provides a switch 16 for selectively applying electrical power received by a cord 17 to an electrical motor carried within the housing 12. For two-handed operation of the trimmer 11, an auxiliary handle 18 is provided upon the tube 13. The lower housing 12 carries a rotatable head 19 from which extends at least one length of a flexible, non-metallic filament or cutting line 21. The head can be generally of any suitable construction such as described in U.S. Pat. No. 4,052,789. Rotation of the head 19 about an axis passing through the housing 12 extends the cutting line 21 at a vegetation-cutting attitude into a cutting plane which is substantially perpendicular to the axis of rotation of the head.

In FIG. 2, there is shown an enlargement of the housing 12 with a portion of the tubing 13 carrying a plurality of air induction openings 22. These openings introduce a flow of cooling air over the prime mover contained in the housing 12. In the particular embodiment being described, the housing 12 includes an electric motor 23 which has a downwardly-extending drive shaft 24. The motor has a conventional relationship of speed inversely proportional to the load. The head 19 is threadedly connected to the shaft 24 by a metal adaptor 26. The adaptor 26 extends from the upper face of the head 19 surrounded by a plurality of veins 27 serving as a centrifugal blower for moving air radially outward from the head 19 during its rotation. As a result, the induced flow of air cools the motor 23 within the housing 12. The head 19 includes a hub 42 and a lower cover or glide ball 51. The ball 51 is secured to the hub 42 in any convenient fashion. The hub 42 carries in its side peripheral surface 30 an aperture 31 through which the cutting line 21 extends radially outward. A guide bar 36 may be placed across the open end of the aperture 31 to limit axial movement of the cutting line 21.

The housing 12 includes a rearwardly-extending tail part 32 which serves as a protection to the user to prevent inadvertent contact with the rotating cutting line 21. Also, the tail part provides an automatic limit to the extension of the cutting line 21 from the head 19. More particularly, the tail part 32 has a downwardly-extending projection 33 in which is embedded a metal cutting blade 34. As a result, the cutting line 21 rotated by the head 19 can never have an operating length greater than the distance from the axis of rotation to the cutting blade 34, since any greater length automatically will be severed.

The head 19, as seen in FIG. 3, is disc-like with a smooth peripheral side surface 30 which has the aperture 31. Also a metal curvilinear bearing surface 41 covers the leading edge of the aperture 31. The hub carries in non-rotating connection the adapter 26 in which the drive shaft 24 is threaded. In addition, the adapter 26 extends axially through the head 19 to form a convenient stud 43 to thread the ball 51 for securing the various head elements together. The interior of the hub 42 is formed into a cylindrical opening 44 in which is disposed a spool 46. The spool is mounted for independent rotation relative to the head 19. For this purpose, a cylindrical interior wall 47 of the spool is journaled on a post 48 about the stud 43. Preferably, the post 48 is integral with the hub 42. The wall 47 abuts upon an end 39 formed on the ball 51. A supply of the cutting line 21 is coiled upon the spool 46 in several layers 49. The interior end of the coiled cutting line 21 is secured to the spool 46. The other end of the cutting line 21 extends outwardly through the aperture 31.

The exposed surface 52 of the head 19 is of convex configuration and is smooth in contour, without substantial projections and recesses capable of trapping appreciable vegetation. Preferably, the surface 52 is coaxially aligned with the axis of rotation of the head 19. Stated in another manner, all parts of the surface 52 are unbroken in the line of travel during rotation of the head 19. However, this surface may be curved or multiplanar on a radial line extending across the head. In this manner, the surface 52 travels freely through the vegetation being cut, without appreciable loading of the electric motor 23.

As shown in FIG. 3, the glide ball 51 is spaced axially away from the reel flange 53 on the spool 46. Thus, the spool can rotate freely relative to the ball 51. The reel flange 54 of the spool is spaced from the interior end surface 50 of the hub 42. The cam 56 is mounted in this space 37 and provides an end bearing to assist free rotation of the spool 46 in head 19.

Figure 4:
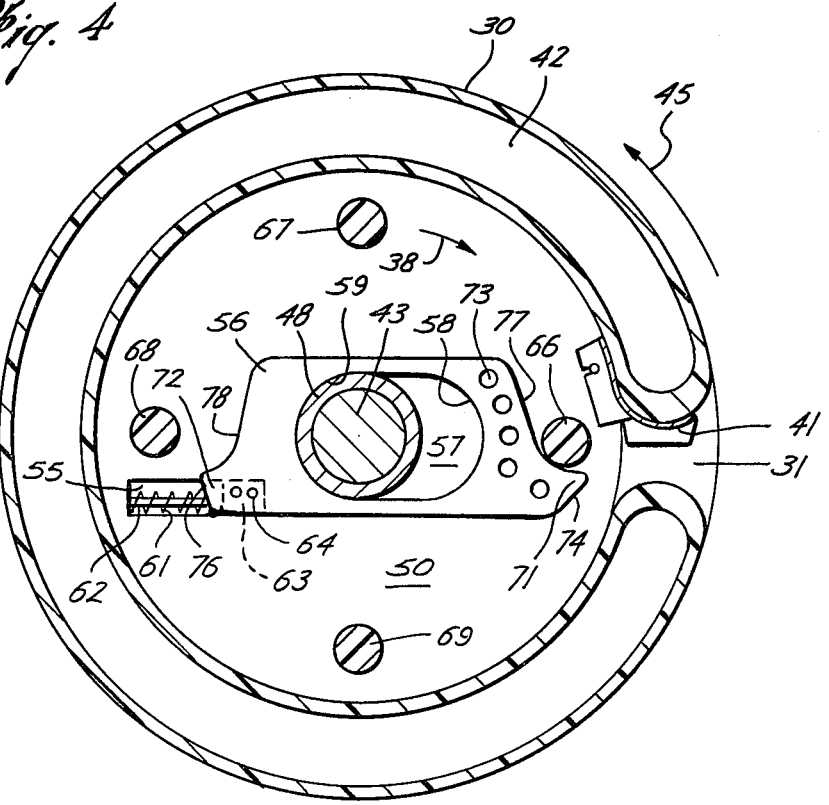
FIG. 4 is a horizontal cross-section of the head shown in FIG. 3 taken along line 4—4, illustrating the cam in its initial position.
Figure 5:
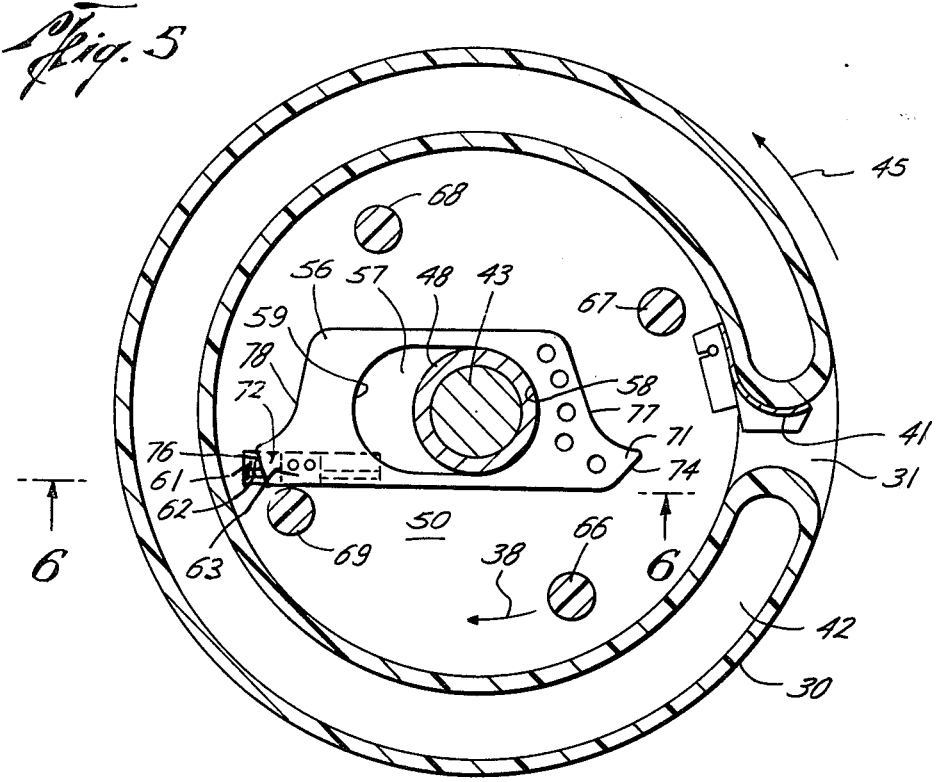
FIG. 5 is the section of FIG. 3, but with the cam moved to its outward position with extension of the cutting line from the head.

Referring to FIG. 4, the housing or head 19 may be rotated counterclockwise as shown by the arrow. However, the spool 46 then will rotate clockwise, relative to the hub 42, as shown by the arrow 38. The cam 56 is a mechanism responsive to centrifugal forces for controlling rotation of the spool relative to the hub whereby additional increments of cutting line can be selectively fed from the head into the cutting plane. The cam is arranged to provide this control function responsive to the change in rotational speed (e.g., stop and start) of the head between conditions of long and short lengths of extended cutting line. At reduced rpm of the head such as reflecting long extended cutting line (e.g., 6,000 rpm or less), the cam is shown in FIG. 4 in its initial position where the spool is locked to the head (non-line-feeding condition). At an increased rpm of the head such as reflecting short extended cutting line (e.g., 7,000 rpm or greater), the cam is laterally displaced into its outward or line-feeding position as shown in FIG. 5. Cam displacements allow the spool to rotate, feeding the increment (e.g., two inches) of cutting line from the head. As a result, the increased extended cutting line reduces the head rpm and the cam returns to its initial position locking positively the spool and hub together. The centrifugal forces exerted upon the extended cutting line induce spool rotation when the cam moves between its initial and outward positions.

The described variation in the rpm conditions of the rotating head responsive to changes in the extended cutting line length is inherent in all conventional electric and gasoline-powered trimmers. Obviously, it takes more power (torque) to rotate the head 19 with a long extended cutting line, which results in reduced rotational speed when the prime mover is powered by a fixed power magnitude (constant voltage or fixed throttle setting).

The change in rotational speed is preferably produced manually as by stopping rotation of the head, and then rotating the head at normal cutting speeds by use of the switch 16 in the handle 14.

More particularly, the cam 56 is arranged to be laterally displaced to its outward position (FIG. 5) by centrifugal forces at the increased rpm of the head 19. The cam 56 is biased to return to its initial position (FIG. 4) against lesser centrifugal forces at the reduced rpm of the head. Movement of the cam 56 between these positions controls rotation of the spool 46 in the hub 42.

Preferably, the cam 56 is unitary, i.e., of rigid one-piece construction so as to avoid multi-part balancing problems which make difficult proper synchronization in operation at several speeds.

The cam 56 can be an elongated member of thin metal (e.g., aluminum), and is mounted for lateral displacement in the space 37 between the flange 54 and surface 50. As seen in FIGS. 3 and 4, the cam 56 resides in a plane transverse to the rotational axis of the head 19. The post 48 serves as a guide for an elongated opening 57 within the cam 56. The opening 57 has rounded ends 58 and 59 which abut the post 48 when the cam 56 is at its initial and outwardly displaced lateral positions, respectively.

Figure 6:
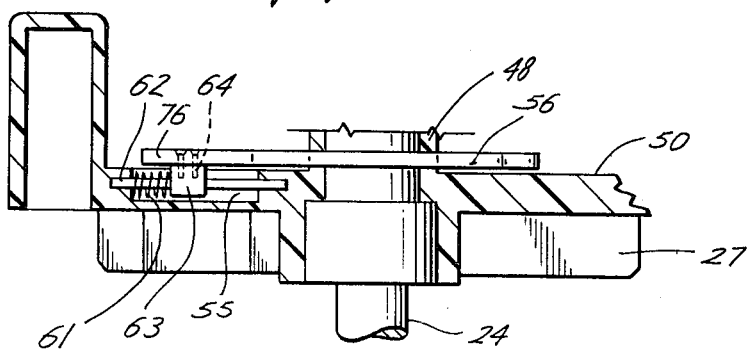
FIG. 6 is a partial vertical section taken along line 5—5 of the head shown in FIG. 5.

The cam 56 is biased into the initial position (FIG. 4) at the reduced rpm of the head such as with long extended cutting line. A spring 61 mounted about a guide rod 62 can provide this biasing force. The spring 61 and rod 62 reside in an opening 55 adjacent surface 50 within the hub 42. A guide block 63 (FIG. 6) is secured to the inner surface of the cam 56 by pins 64. The block 63 is bored to receive slidably the rod 62 which serves to guide the cam in its lateral displacements within the hub 42. The rod 62 is secured at its ends within the end portions of the hub 42.

The cam 56 is provided with parts to form an escapement mechanism to rotate the spool 46 through a predetermined angular displacement. For this purpose, the flange 54 of spool 46 is provided with a plurality of equally-spaced projections, teeth or pins 66–69. These pins cofunction with the cam 56 to provide for ninety-degree rotational angular advancement of spool relative to the hub 42 to feed cutting line from the head 19 during cam displacement. Other escapement arrangements can be used for different controlled spool rotations, if desired.

The cam 56 is provided at its ends with lugs 71 and 72 to cooperate with the pins 66–69. The lug 71 engages the pins (e.g., pin 66 in FIG. 4) to prevent spool rotation when the cam 56 is in its initial position. The lug 72 regulates spool advancement when the cam 56 is in its outward position by engaging the next arriving pin (e.g., pin 69 in FIG. 5) to limit spool rotation to one-half its displacement, or 45 degrees. Then, the now-extended cutting line or manual control reduces head rotation to the reduced rpm and the cam 56 returns to its initial position (as seen in FIG. 4) whereby the lug 71 engages the pin 67. The spool rotates the remaining half of the angular displacement (e.g., 45 degrees) and the cutting line extension is completed. No further spool rotation to extend cutting line can occur until the line is shortened or the head reaches the increased rpm.

If desired, the last increment of cutting line feeding by the second half of spool angular displacement can be set at an rpm value much less than normally provided by the motor (e.g., 1,000 rpm rather than 6,000 rpm). For this purpose, the spring 61 can be made sufficiently weak that the cam does not return to its initial position except when the operator of trimmer 11 releases the switch 16 and the head slows to the preselected reduced rpm.

The particular rotational speed of the head 19 to produce lateral shifting of the cam 56 between initial and outward positions is determined by the mass of the cam relative to the axis of rotation and the bias provided by the spring 61. The spring 61 and the mass of the cam are adjusted to provide the desired functioning parameters. For example, a stock spring 61 can be complemented by boring one or more holes 73 within the cam 56 adjacent the lug 71. Alternatively, one or more turns can be removed from the spring 61 for proper cam functioning.

The cam 56 is also arranged to be positive acting with respect to rotation of the spool. Stated in another manner, at no time can the cam 56 be held in any position other than its initial and outward positions. For this purpose, the cam 56 has the lugs 71 and 72 provided with camming surfaces 74 and 76. These inclined surfaces slide past the encountered pins 66–69. At no time can either lug abut directly against these pins or stop in lateral displacement before reaching the cam's initial and outward positions. Also, only one of the lugs can engage the pins at any time.

In addition, the cam 56 has curved surfaces 77 and 78 that cooperate with the rounded cross-section of the pins 66–69 to avoid sudden stop-and-go movement of the spool responsive to lateral movement of the cam.

The curved surface 77 engages the pins 66–69 and stops spool rotation relatively gradually. A very hard pull on the cutting line (e.g., when it is caught in a wire fence), can move the cam outwardly and relatively slowly even to the extent that pin 66 passes the lug 71. Thus, the spring 61 cushions gradually the stopping of rotation by the spool. Also, as the cam 56 is displaced laterally toward the outward position, rotation of the spool begins gradually as the pins 66–69 slide away from the curved surface 77. As a result, the amount of rotary force (torque) applied by the pins 66–69 on the curved surface 77 assist moving the cam 56 between the initial and the outward positions.

In like regard, the curved surface 78 gently moves sideways the pins 66–69 which are before it when the cam 56 reaches its outward position. As a result, the next pin 67 is aligned with surface 77 on the lug 71.

The cam 56 is preferably of one-piece or unitary construction so that the functioning of the lugs 71 and 72 relative to pins 66–69 on spool 46 is in timed sequence. This timed sequence always is maintained irrespective of irregular operating condition (debris in head, vibration during cutting, etc.).

Although the head 19 may be formed of metal, plastic or other material, it is preferred to use rather inexpensive polymeric materials (e.g., Nylon) which are readily fabricated by high-speed molding operations. The spool 46 can carry sufficient cutting line 29 (e.g., 0.065–0.100 inch in diameter Nylon ® monofilament polymer) for several years' vegetation cutting before requiring a new supply of cutting line. When desired, the glide ball 51 is unthreaded from stud 43. Then, the spool is removed from the head. Cutting line can be wound upon the spool 46. Alternatively, a spool carrying a fresh supply of cutting line is introduced into the spool 46. The ball 51 is threaded upon the stud 43 to reassemble the head.

From the foregoing description, it will be apparent that there has been provided a novel apparatus for cutting vegetation which provides a convenient and safe method of extending cutting line as desired by the operator. It will be understood that certain changes or alterations in the present apparatus may be made without departing from the spirit of this invention. These changes are contemplated by and are within the scope of the appended claims which define the invention. Additionally, the present description is intended to be taken as an illustration of this invention.

What is claimed is:

1. A filament-type trimmer comprising:
   a rotatable housing;
   at least one spool rotatably supported within said housing having at least one filament wound about said spool;
   guide means disposed on said housing for guiding an end portion of said filament from said spool to the exterior of said housing wherein said end portion of said filament is extended from said housing by centrifugal force upon rotation of said housing;
   means for rotatably driving said housing; and
   control means comprising a single thin flat cam and biasing means for urging said cam into a first position in response to the rotational speed of said housing being below a selected speed, said control means for increasing the length of said end portion of said filament by a selected substantial amount in direct response to the rotational speed of said housing exceeding said selected speed and for detecting a decrease in the rotational speed of said housing due to said increased length of said end portion of said filament.

2. The filament-type trimmer according to claim 1 wherein said single thin flat cam comprises a single thin flat metal strip having an elongate central opening adapted to be slidably received over an axial post in said rotatable housing and wherein said biasing means comprises a single spring for urging said thin flat metal strip into said first position in response to the rotational speed of said housing being below said selected speed.

3. A filament-type trimmer comprising:
a rotatable housing;
at least one spool rotatably mounted within said housing having at least one filament wound about said spool;
guide means disposed on said housing for guiding an end portion of said filament from said spool to the exterior of said housing wherein said end portion of said filament is extended from said housing by centrifugal force upon rotation of said housing;
means for rotatably driving said housing; and
control means comprising a single thin flat cam movable between a first position and a second position, said single thin flat cam being effective to restrain rotation of said spool relative to said housing while disposed in said first position and to release said spool for rotation relative to said housing while moving from said first position to said second position, thereby increasing the length of said extended end portion of said filament by a selected substantial amount,
said single thin flat cam adapted to move from said first position to said second position in direct response to the rotational speed of said housing exceeding a selected speed and to move from said second position to said first position in response to the decrease in rotational speed of said housing due to said increasing of length of said extended end portion of said filament by said selected substantial amount.

4. The filament-type trimmer according to claim 3 wherein said control means further includes biasing means for urging said single thin flat cam into said first position in response to the rotational speed of said housing being below said selected speed.

5. The filament-type trimmer according to claim 4 wherein said biasing means comprises a single spring.

* * * * *